US010618178B2

(12) United States Patent
Meyer et al.

(10) Patent No.: US 10,618,178 B2
(45) Date of Patent: Apr. 14, 2020

(54) AUTOMATING ROBOT OPERATIONS

(71) Applicant: AIRBUS DEFENCE AND SPACE GMBH, Ottobrunn (DE)

(72) Inventors: Meinhard Meyer, Ottobrunn (DE); Christian Herrles, Ottobrunn (DE); Jens Fuhrmann, Ottobrunn (DE)

(73) Assignee: Airbus Defence and Space GmbH, Taufkirchen (DE)

( * ) Notice: Subject to any disclaimer, the term of this patent is extended or adjusted under 35 U.S.C. 154(b) by 167 days.

(21) Appl. No.: 15/271,975

(22) Filed: Sep. 21, 2016

(65) Prior Publication Data
US 2017/0080575 A1     Mar. 23, 2017

(30) Foreign Application Priority Data
Sep. 22, 2015    (EP) ..................................... 15186310

(51) Int. Cl.
*B25J 9/16*          (2006.01)
*G01B 11/00*       (2006.01)
(Continued)

(52) U.S. Cl.
CPC ........... *B25J 9/1697* (2013.01); *B25J 9/1605* (2013.01); *B25J 9/1692* (2013.01); *B25J 9/1694* (2013.01); *G01B 11/002* (2013.01); *G05B 19/402* (2013.01); *G05B 19/406* (2013.01); *G06T 7/70* (2017.01); *G05B 2219/31305* (2013.01);
(Continued)

(58) Field of Classification Search
CPC ...... B25J 9/1697; B25J 9/1694; B25J 9/1605; B25J 9/1692; G05B 19/406; G05B 19/402; G05B 2219/40557; G05B 2219/39391; G05B 2219/39057; G05B 2219/39039; G05B 2219/37567; G05B 2219/313; G01B 11/002; G06T 7/004; Y10S 901/09
See application file for complete search history.

(56) References Cited

U.S. PATENT DOCUMENTS

| 4,639,878 A | 1/1987 | Day et al. |
| 6,044,308 A | 3/2000 | Huissoon |

(Continued)

FOREIGN PATENT DOCUMENTS

| DE | 10 2014 011852 | 3/2015 |
| JP | H03 280106 | 12/1991 |

(Continued)

OTHER PUBLICATIONS

German Search Report for Application No. 15186310 dated Apr. 8, 2016.

*Primary Examiner* — Menatoallah Youssef
(74) *Attorney, Agent, or Firm* — Jenkins, Wilson, Taylor & Hunt, P..A

(57) ABSTRACT

A method to control operation of a robot includes generating at least one virtual image by an optical 3D measurement system and with respect to a 3D measurement coordinate system, the at least one virtual image capturing a surface region of a component. The method further includes converting a plurality of point coordinates of the virtual image into point coordinates with respect to a robot coordinate system by a transformation instruction and controlling a tool element of the robot using the point coordinates with respect to the robot coordinate system so as to implement the operation.

15 Claims, 2 Drawing Sheets

(51) Int. Cl.
*G05B 19/402* (2006.01)
*G05B 19/406* (2006.01)
*G06T 7/70* (2017.01)

(52) U.S. Cl.
CPC .............. *G05B 2219/37567* (2013.01); *G05B 2219/39039* (2013.01); *G05B 2219/39057* (2013.01); *G05B 2219/39391* (2013.01); *G05B 2219/40557* (2013.01); *Y10S 901/09* (2013.01)

(56) References Cited

U.S. PATENT DOCUMENTS

2012/0072021 A1* 3/2012 Walser .................. B25J 9/1697
700/254
2015/0366624 A1* 12/2015 Kostrzewski ...... A61B 17/3421
606/130
2016/0151915 A1* 6/2016 Nishi ..................... B25J 9/1692
700/247

FOREIGN PATENT DOCUMENTS

JP         H11 85235        3/1999
WO    WO 2015/121767    8/2015

* cited by examiner

AUTOMATING ROBOT OPERATIONS

CROSS-REFERENCE TO RELATED APPLICATION

This application claims priority to European Patent Application EP 15 186310.7 filed Sep. 22, 2015, the entire disclosure of which is incorporated by reference herein.

TECHNICAL FIELD

The present disclosure relates to a method for controlling operation of a robot, to one or more computer-readable storage media having corresponding instructions stored thereon, and to an installation for automatically implementing operations using an included robot.

BACKGROUND

In the manufacture and maintenance of elements and components, it is known to implement a wide range of operations using robots. If the corresponding parts to be processed are not too large, in particular if they have a diameter not greater than approximately 2 m, the relevant operation regions in which one or more operations are to be carried out may be approached and processed by the tool elements of robots in a highly precise manner in accordance with the prior art. Thus, for example, surface treatments (for example cleaning, priming, sealing and/or lacquering treatments) may be carried out, connections may be established between a plurality of individual elements, holes may be drilled, grooves may be milled, electronic contacts may be soldered or gaps may be sealed, to name just a few of the many possibilities.

If different component variants are to be processed or treated, in the conventional procedure they always have to be recalibrated, resulting in high complexity. In addition, the conventional automatic control becomes more difficult as the size of the parts to be processed increases. For example, in aviation, architecture or shipbuilding, where the components usually have a diameter of more than 2 m, robots or installations used, or else the tool elements thereof, are generally initially brought to an approximate position relative to a component to be processed by one or more operators (manually) and/or using automated interior positioning (for example by way of indoor GPS), before being precisely calibrated using fixed reference points in space, in a time-consuming, complex method, so as to be able to implement the intended operation. Equally, inaccuracies often occur in this context, the consequences of which in turn have to be prevented and/or eliminated, adding further complexity. For example, if the operation involves applying material and/or additives in a very precise location (for example filling a groove with filler material, covering rivets and/or sealing edges), the corresponding application edges are generally masked before the operation, so as to prevent any soiling to the component resulting from imprecise positioning of a material nozzle and/or a (locally) inappropriate amount of material; excess material is removed after a filling process. The corresponding masking material has to be removed again after the process. Quite often, the material properties (for example viscosity, curing and/or working life) are only inadequately adaptable to automation or to different processing speeds in automation, and the robot cannot be guided precisely enough to the local points of the large components. Ultimately, the quality of local application in large components cannot be evaluated in real time by conventionally used means.

SUMMARY

One of the ideas of the present disclosure is to provide a method by which the aforementioned drawbacks can be prevented and robot operations can be implemented precisely and automatically.

A method according to the disclosure herein is used to control robot operation. The method comprises generating at least one virtual image (sometimes also referred to in the present document as a "virtual image for operation implementation" to distinguish from other virtual images mentioned in the following) by an optical 3D measurement system and with respect to a coordinate system of the optical 3D measurement system; this coordinate system is also referred to in the following as a "3D measurement coordinate system". The at least one virtual image captures a surface region of a component (in other words contains image data from the surface region). The surface region is preferably a region on which an operation is to be implemented; it may also be merely part of a region of this type, in other words an operation may be required or provided beyond the captured surface region.

A method according to the disclosure herein further comprises converting a plurality of point coordinates of the virtual image (which are thus present at point coordinates of the 3D measurement coordinate system) into a robot coordinate system using a transformation instruction and controlling a tool element of the robot using the converted point coordinates with respect to the robot coordinate system so as to implement a (provided) operation.

Optical 3D measurement systems are known in the art. They generally comprise at least a camera and a processing and control unit, which is set up to process three-dimensional data captured by the camera, in particular to generate one or more virtual images therefrom. A virtual image of this type comprises a data structure having a plurality of points in 3D measurement coordinates; preferably, the virtual image can be (accurately) displayed on a screen in the form of a reproduction. In industrial production, optical 3D measurement systems are conventionally used for automatic quality control, in particular to carry out a variance comparison in manufactured components and thus to distinguish parts for further use from rejects.

The virtual image may in some cases be stored in a data store, for example of the optical 3D measurement system.

Generating a virtual image may in some embodiments comprise detecting a plurality of individual images by at least one camera of the optical 3D measurement system, which are superposed. In some embodiments, the component may comprise a plurality of component orientation points which are detected by the virtual image. Component orientation points of this type (which may be applied markings or be intrinsic to the component (such as corners or edges)) can be used for correct and accurate superposition of the individual images.

In some embodiments, the method may comprise supplementing the virtual image using at least one virtual image additionally generated by the optical 3D measurement system and/or using read-in data (for example construction data or CAD data of the component); the plurality of point coordinates, which according to the method are converted into point coordinates of the robot system, may in this case be point coordinates of the supplemented virtual image. In this way, the robot can be controlled appropriately and can implement the provided operations even in regions which were not detected in the (original) virtual image.

The plurality of point coordinates of the virtual image may in particular define at least one portion of an operation path (trajectory) along which the operation is provided by the tool element. In a specific example, in which the provided operation comprises filling a groove with filling material, the plurality of point coordinates may in particular determine at least a portion of the groove surface.

Controlling the tool element may comprise data pre-processing (for example of the transformed or converted point coordinates in the robot coordinate system) into a form usable by a robot control system; this data pre-processing may be carried out by a processing unit of the optical 3D measurement system, a processing unit of the robot and/or an external processing unit.

The coordinate systems of the optical 3D measurement system and/or robot may for example each be specified in a manner intrinsic to the system and/or be selectable by a user and/or (in the case of the optical 3D measurement system) be based on one or more detected elements such as a component. A robot control system may be set up to control positions each determined on the basis of robot coordinates by way of the at least one tool element, in other words to arrange the tool element (or a predetermined reference point on the tool point such as a tool tip) at each of the positions.

The present disclosure makes possible precise control or positioning of the tool element in accordance with data captured by the optical 3D measurement system. The 3D measurement system can thus to some extent act as the eye of the robot. By the transformation instruction, the 3D measurement coordinate system and the robot coordinate system are calibrated. In this way, the optical 3D measurement system and the robot may in particular also be moved to the component, and the system does not have to be orientated because the relationship between the component and the tool element is established.

Specifically, by the transformation instruction, the robot coordinate system and the 3D measurement coordinate system are orientated relative to one another, independent of other external conditions. Even after the calibration, it is not necessary to maintain a specific position or orientation of a component to be processed, since the system can be orientated by way of orientation points on the component and robot (or the tool element thereof).

The present disclosure in particular makes it possible for robot operations to be implemented precisely and automatically, in which operations it is possible to dispense with initial or continuous guidance of the robot to an approximate processing position (manually or using an indoor GPS), which subsequently has to be specified again exactly.

Controlling the tool element may involve positioning the at least one tool element and/or involve an operation to be carried out at the position.

In some embodiments, a method according to the disclosure herein comprises determining implementation parameters for the operation using the plurality of point coordinates in the 3D measurement coordinate system and/or in the robot coordinate system. Implementation parameters of this type may for example determine a setting of an operation speed (for example a rotational speed of a rotating tool element), a dwell time of the tool element at the relevant position (for example a duration of a drilling process), an ejection amount of material required locally at a position (for example filling or adhesive material), a locally appropriate spray pressure of a nozzle of the tool element or the like.

In a specific example, the at least one virtual image generated by the optical 3D measurement system can highly precisely capture dimensions of groove to be filled with filling material, in particular including local irregularities of the groove, in which for example more or less filling material is to be introduced (for example because the groove is deeper, shallower, wider or narrower at one point than at other points) or at which the tool element has to change movement direction and/or carry out an additional movement. From these, the corresponding implementation parameters can be determined and the tool element can be controlled appropriately.

In some embodiments of a method according to the disclosure herein, the implementation of the operation is monitored and/or regulated by generating at least one additional virtual image using the optical 3D measurement system. Preferably, the generation of the at least one additional virtual image and/or the transmission thereof to the robot take place (substantially) in real time. Thus, in particular a result of an operation step preceeding the generation of the additional virtual image can be captured. At least one subsequent operation step can subsequently be controlled or regulated by taking into account this result. This makes quality control and fault reduction possible.

A method according to the disclosure herein (in the various possible embodiments) may be carried out automatically, at least in part, on an installation comprising at least one processing unit, a robot and a 3D measurement system connected for optical communication therewith; preferably, the processing unit, the robot and the optical 3D measurement system are connected for communication (for example wirelessly or wired or else based on repositioning of at least one storage medium) and/or the processing unit is integrated at least in part into the robot and/or the optical 3D measurement system. The associated instructions for carrying out a method according to the disclosure herein may be stored on one or more computer-readable storage media.

Accordingly, a storage medium according to the disclosure herein or a plurality of storage media according to the disclosure herein contains instructions of this type (stored as data structures).

A method according to the disclosure herein may for example be carried out by a processing unit which is connected for communication (for example wireless or wired) with the robot and the optical 3D measurement system and/or is integrated at least in part into the robot and/or the optical 3D measurement system. An installation according to the disclosure herein may analogously comprise a processing unit of this type.

The transformation instruction may be stored on a (or the) storage medium and be accessible to one or more components of an installation of this type, or it may be stored in one of the components.

In some embodiments, a method according to the disclosure herein comprises determining the transformation instruction. An embodiment of this type may in particular comprise determining position coordinates of a plurality of points in space with respect to the 3D measurement coordinate system and determining an mapping instruction by which the position coordinates with respect to the 3D measurement coordinate system are mapped onto position coordinates of the points in space with respect to the robot coordinate system; this mapping instruction is thus the transformation instruction.

Position coordinates of the plurality of points in space with respect to the 3D measurement coordinate system may in some embodiments be determined on the basis of the at least one virtual image and/or at least one further virtual image, for example by reading out the position coordinates from a corresponding data structure of the relevant virtual image.

The position coordinates of the points in space, which are preferably arranged on the robot (for example on the surface thereof), with respect to the robot coordinate system may be read out from a data store; an installation according to the disclosure herein may accordingly be set up to read out the position coordinates from a data store (which may be comprised by the installation or be used as an external storage medium). In particular, the position coordinates may have been determined in a previous method and/or be provided at least in part as system or machine data of the robot, for example if the points in space comprise one or more fixed points (for example markings or corners) on a robot base or on another part (which is preferably stationary during the operations of the robot) of the robot. Alternatively or in addition, for at least some of the plurality, the position coordinates may be selected with respect to the robot coordinate system and controlled by a movable robot element, for example by the tool element.

In some embodiments, a method according to the disclosure herein comprises establishing (for example selecting) the position coordinates with respect to the robot coordinate system for at least one of the points in space, positioning (at least) one reference point of a robot element which is movable (relative to a robot body) (for example a robot arm, in particular of the tool element of the robot) at the at least one point in space and generating a further virtual image (in this case too referred to as a virtual image for calibration (of the coordinate systems)) using the optical 3D measurement system. The further virtual image captures the component and the reference point positioned at the at least one point in space with respect to the 3D measurement coordinate system.

In some embodiments of a method according to the disclosure herein, for all points in space out of the plurality, the position coordinates are determined with respect to the 3D measurement coordinate system. The position coordinates with respect to the robot coordinate system are each selected and approached by the reference point, which in each case is captured there in a virtual image (preferably together with at least part of the component) by the optical 3D measurement system. Thus, the corresponding position coordinates are determined with respect to the 3D measurement coordinate system.

In this context, the reference point is preferably a point fixed in advance with respect to the movable robot element (which in particular may be the tool), for example a point on the movable robot element and/or a point to be calculated therefrom (which is in a fixed geometric relationship with the robot element), for example a tip of the movable robot element and/or a central point on a nozzle of the robot element (for example at a nozzle outlet). The position coordinates with respect to the optical 3D measurement system may result from the (optionally further) virtual image, for example are read out therefrom (or from the corresponding data structure).

In this way, the position coordinates with respect to the 3D measurement system can be determined for suitable points in space, even if no data of this type are known in advance (for example from a data store). For a suitable selection of the position coordinates with respect to the robot coordinate system, computing complexity for determining the transformation instruction can additionally be reduced.

In some cases, the plurality of points in space comprises four points in space, three of which span a plane in which the fourth point in space is not positioned.

A variation of a method according to the disclosure herein which additionally comprises calibrating the reference point located on the movable robot element (for example on the tool element) may be advantageous. In this way, the reference point can be suitably established on the movable robot element, in particular on a replaceable component of the tool element such as a nozzle or a drill bit. Thus, the robot coordinates of the reference point can be determined (for example from robot coordinates of one or more components which are invariable on or relative to the tool element) at each position (i.e. even if the tool element moves), and conversely the reference point can be guided to positions specified by robot coordinates by a robot control system based on the robot coordinate system.

In some variations of a method according to the disclosure herein, the at least one virtual image (for operation implementation) (which in this embodiment is a first virtual image (for operation implementation)) captures the tool element in a given positioning together with a plurality of orientation points arranged on the tool element; the "given positioning" is a position and orientation in which the tool element is located when the at least one virtual image (for operation implementation) is generated. The orientation points may for example be points on at least one corner and/or edge of the tool element and/or be provided by way of an applied marking, such as at least one glued or painted point, or by way of at least one glued or painted line or geometric shape.

A method of this embodiment may further comprise repositioning the component (which may include changing an orientation and/or a position of the component) and/or placing another component (this can be in any desired orientation) in a capture region of the optical 3D measurement system (taking into account the fact that the optical 3D measurement system is displaceable; the capture region may thus also comprise points which may only be captured as a result of repositioning the optical 3D measurement system) and generating a further virtual image (for operation implementation) with respect to the 3D measurement coordinate system. The further virtual image captures a surface region of the repositioned or different component and the plurality of orientation points on the tool element located in the given positioning by the 3D measurement system. Thus, in particular, when the first and the further virtual image are captured the tool element is in the same positioning in each case (in which it may have remained until the further virtual image was generated or into which it may have been brought again).

In this embodiment the transformation instruction remains valid in spite of the change in the component, and thus continues to map point coordinates with respect to the 3D measurement system onto the matching point coordinates with respect to the robot coordinate system, since the 3D measurement system can be orientated to the orientation points on the fixed tool element, and the coordinate system thereof can be orientated accordingly. It is thus not necessary to redetermine a transformation instruction.

A method of this type may further comprise converting a plurality of point coordinates (with respect to the 3D measurement coordinate system) of the further virtual image into point coordinates with respect to the robot coordinate system, by the transformation instruction, and controlling the robot by these converted point coordinates with respect to the robot coordinate system so as to implement a further operation. Thus, an appropriate operation can also be implemented in the aforementioned advantageous (in particular precise) manner on the repositioned or different component.

The same applies to repositioning the robot while the component remains stationary. In an advantageous embodiment of a method according to the disclosure herein, the at least one virtual image (for operation implementation) captures the component in a given component positioning and captures the tool element having a plurality of orientation points arranged thereon; in this case, the component preferably comprises a plurality of component orientation points. Component orientation points of this type and/or the orientation points on the tool element may for example be points on at least one corner and/or edge of the relevant element and/or be provided by way of an applied marking, such as at least one glued or painted point, or by way of at least one glued or painted line or geometric shape. The "given component positioning" comprises a position and orientation of the component.

A method of this type may further comprise repositioning the robot and generating a further virtual image by the optical 3D measurement system (and with respect to the 3D measurement coordinate system thereof), which comprises at least the surface region and/or a further surface region of the component located in the first position and the plurality of orientation points arranged on the tool element of the repositioned robot.

A method of this type may subsequently further comprise converting a plurality of point coordinates of the further virtual image (in other words in relation to the 3D measurement coordinate system) into point coordinates with respect to the robot coordinate system by the transformation instruction and controlling the robot using the point coordinates of the robot coordinate system so as to implement a further operation.

The component preferably has a diameter of 2 m or more; in the present disclosure, "diameter" is understood to mean the maximum possible distance between two points located on the component. In some embodiments of a method according to the disclosure herein, the component is an element from aircraft construction, for example a fuselage shell element or wing shell element.

BRIEF DESCRIPTION OF THE DRAWINGS

In the following, features of some embodiments of the disclosure herein are described in greater detail with reference to two drawings. It will be appreciated that the schematically shown individual elements and components can also be combined and/or formed differently from shown and that the present disclosure is not limited to features shown.

In the drawings, schematically.

DETAILED DESCRIPTION

Figure 1:
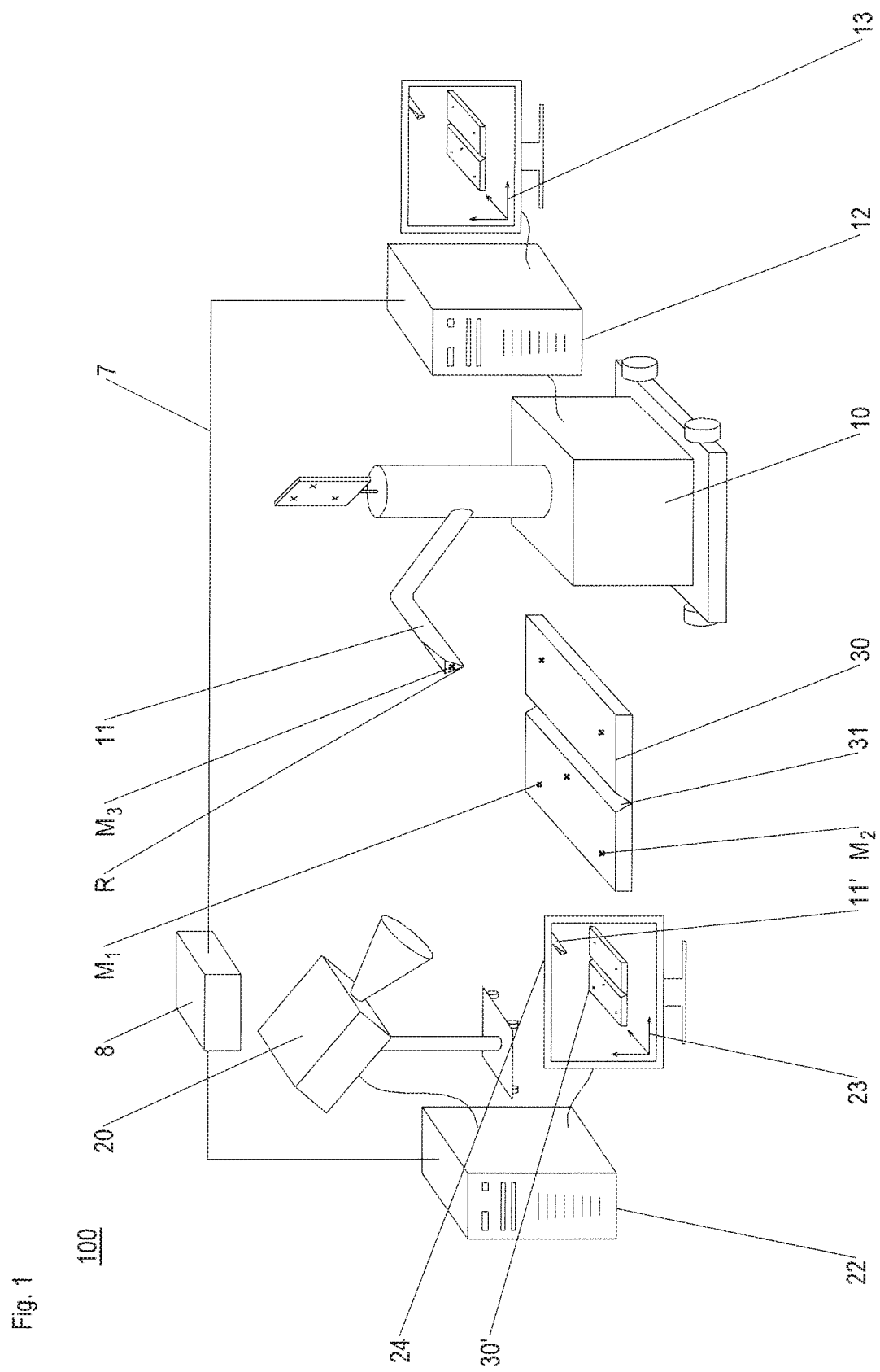
FIG. 1 shows an installation for automatically implementing operations in accordance with an example embodiment of the present disclosure.

FIG. 1 shows an example embodiment of an installation 100 according to the disclosure herein, which is set up in particular to carry out a method according to the disclosure herein.

The installation 100 comprises a robot 10 having a tool element 11 movable by a robot control system. The robot control system is integrated into a processing unit 12 (a computer), and is based on a robot coordinate system 13, which is shown schematically in a screen of the processing unit in FIG. 1.

The installation 100 further comprises an optical 3D measurement system 20, which in turn comprises a processing unit 22, by way of which in particular the operations of the optical 3D measurement system can be controlled. The optical 3D measurement system 20 or the processing unit 22 thereof is based on a 3D measurement coordinate system 23, which is shown schematically on a screen 24 connected to the processing unit in FIG. 1.

In the example shown, the processing units 12 and 22 are interconnected via a communication connection 7 and via a pre-processing device 8. The pre-processing device 8 is an external processing unit which is set up to pre-process data of the optical 3D measurement system for the robot, in other words to bring them into a form usable for controlling the robot. In the example shown, the optical 3D measurement system 20 generates a virtual image, which captures a surface portion of the component 30 having a groove 31 and captures part of the tool element 11; the virtual image is visually displayed on a screen 24 in the drawing; this display comprises the elements 30' and 11' for the component and for the tool element.

By a transformation instruction, a plurality of point coordinates of the virtual image can be converted into point coordinates of the robot coordinate system (13); in the example shown, all of the points of the virtual image have been converted accordingly, and a resulting image has been visually displayed on a screen of the robot.

By the point coordinates converted into its own coordinate system and by the data appropriately pre-processed by the pre-processing device 8, the robot can now appropriately control the tool element 11 in such a way that it implements a provided operation on the component 30.

A plurality of orientation points $M_1$, $M_2$, $M_3$, R are arranged in each case at the component or tool element; in the present example, the orientation point R corresponds to a calibrated reference point and is intrinsically specified by a corner on a tool tip. In the example shown, the other orientation points have each been applied. If the component or robot is repositioned, or if a different component is positioned, the optical 3D measurement system can orientate itself by the relevant orientation points, and can thus also base a subsequently captured virtual image on the 3D measurement coordinate system. Therefore, the transformation instruction for converting 3D measurement coordinates into robot coordinates can remain unchanged.

Figure 2:
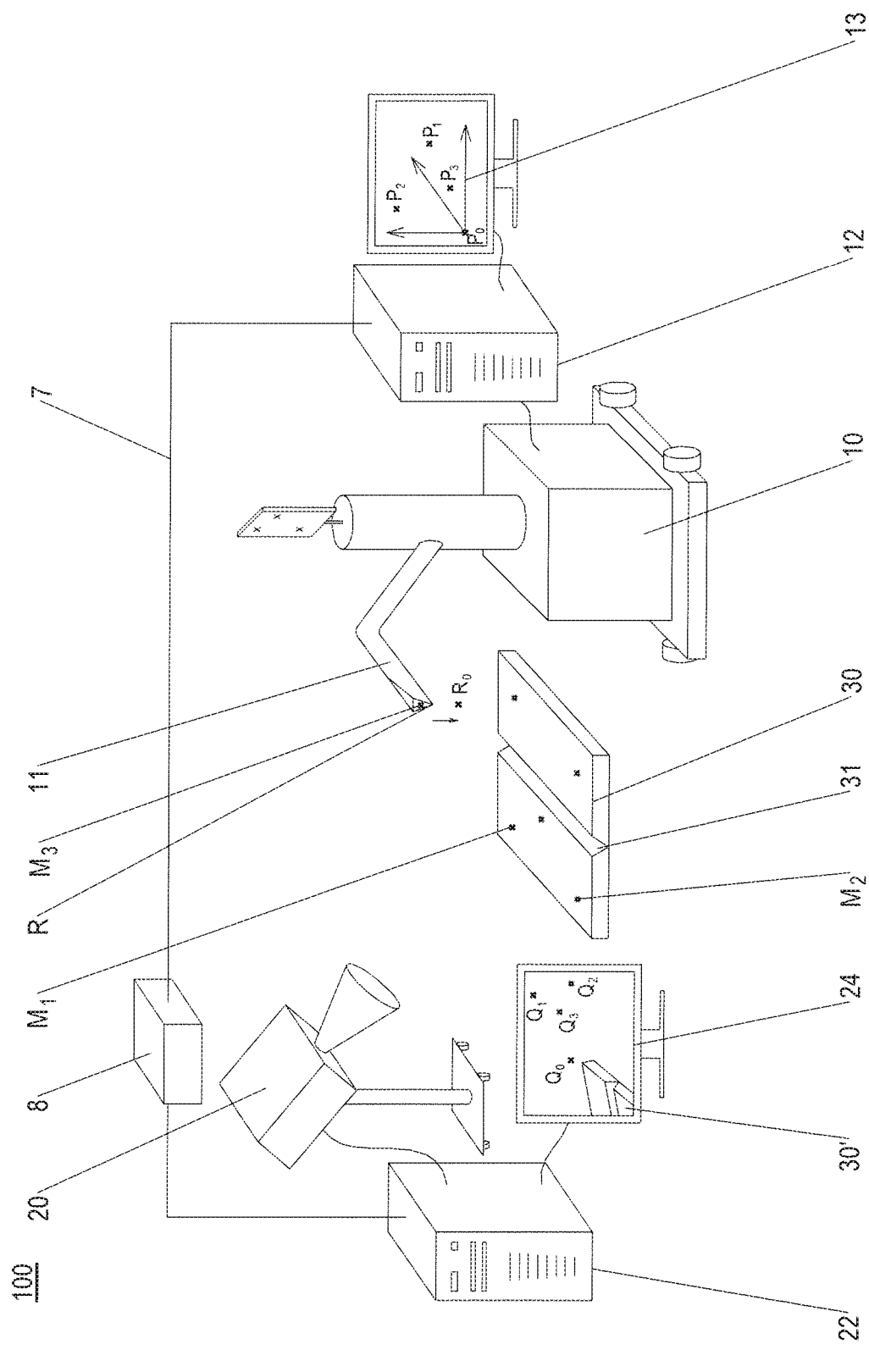
FIG. 2 shows the installation of FIG. 1 in a different situation.

FIG. 2 shows the installation 100 in a situation in which the transformation instruction is determined.

In the example shown, a plurality of points in space comprises three points in space $R_1$, $R_2$ and $R_3$, which are each arranged on a surface of the robot 10. The relevant robot coordinates of the points in space $R_1$, $R_2$ and $R_3$ are preferably stored in a data store and accessible to the processing unit 12.

Furthermore, the plurality comprises a point in space $R_0$; the robot coordinates thereof may for example have been selected.

In the drawings, the points $P_0$, $P_1$, $P_2$, $P_3$ resulting from the robot coordinates associated with the points in space are drawn in the associated robot coordinate system 13 for illustration.

The optical 3D measurement system 20 captures the points in space $R_0$, $R_1$, $R_2$ and $R_3$, and determines the coordinates thereof with respect to its own 3D measurement coordinate system; it thus generates a virtual image for calibration, which is displayed on a screen 24 in the drawing; for orientation, the 3D measurement coordinate system may in particular use a part of the component 30 included in the capture, which for illustration is displayed on the screen 24 of the 3D measurement system 20 as the element 30'. For the point in space $R_0$ (which has been selected in the form of abstract robot coordinates and thus initially has no physical representation, and therefore also cannot be captured by the optical 3D measurement system), a reference point R on the tool element 11 is positioned at the point $R_0$ by the robot control system; this is indicated by the corresponding arrow. If the reference point R can be captured at the point in space $R_0$, the optical 3D measurement system (or the associated processing unit 22) can also determine the position coordinates of the point $R_0$ with respect to the 3D measurement coordinate system. In FIG. 2, the points $Q_0$, $Q_1$, $Q_2$ and $Q_3$ resulting from the position coordinates in the 3D measurement coordinate system are drawn in the coordinate system 23 for illustration.

Once the relevant position coordinates with respect to the different coordinate systems (of the robot and of the optical 3D measurement system) are appropriately transmitted, one of the processing units 12, 22 or both together (and/or the pre-processing device 8 and/or a further processing unit not shown) can determine a transformation instruction by which the position coordinates with respect to the 3D measurement coordinate system are mapped onto position coordinates of the points in space with respect to the robot coordinate system; no referencing at a fixed point in space and no particular orientation of the components of the installation are required for this purpose.

The subject matter disclosed herein can be implemented in software in combination with hardware and/or firmware. For example, the subject matter described herein can be implemented in software executed by a processor or processing unit. In one exemplary implementation, the subject matter described herein can be implemented using a computer readable medium having stored thereon computer executable instructions that when executed by a processor of a computer control the computer to perform steps. Exemplary computer readable mediums suitable for implementing the subject matter described herein include non-transitory devices, such as disk memory devices, chip memory devices, programmable logic devices, and application specific integrated circuits. In addition, a computer readable medium that implements the subject matter described herein can be located on a single device or computing platform or can be distributed across multiple devices or computing platforms.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a", "an" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

What is claimed is:

1. A method for controlling an operation of a robot, comprising:
    generating at least one virtual image by an optical 3D measurement system and with respect to a coordinate system of the optical 3D measurement system, referred to as 3D measurement coordinate system, wherein the at least one virtual image captures a surface region of a component;
    converting a plurality of point coordinates of the at least one virtual image into point coordinates with respect to a robot coordinate system by a transformation instruction;
    determining implementation parameters for the operation using details gathered by the at least one virtual image and the plurality of point coordinates with respect to the 3D measurement coordinate system and with respect to the robot coordinate system; and
    controlling a tool element of the robot using the plurality of point coordinates with respect to the robot coordinate system so as to implement the operation;
    wherein the plurality of point coordinates of the at least one virtual image defines at least one portion of a trajectory along which the operation is provided by the tool element; and
    wherein an implementation of the operation is monitored or regulated by generating at least one additional virtual image using the optical 3D measurement system and substantially simultaneously transmitting the at least one additional virtual image to the robot, whereby the robot subsequently controls or regulates its operations by taking into account a result captured by the at least one additional virtual image.

2. The method of claim 1 wherein the implementation parameters comprise at least one or more of:
    setting of an operation speed or rotational speed of a rotating or non-rotating tool element;
    a dwell time of the rotating or non-rotating tool element at a relevant position;
    an ejection amount of material required locally at the relevant position; and
    a locally appropriate spray pressure of a nozzle of the tool element.

3. The method of claim 1, further comprising:
    determining position coordinates of a plurality of points in space with respect to the 3D measurement coordinate system; and
    determining the transformation instruction by which the position coordinates with respect to the 3D measurement coordinate system are mapped onto position coordinates of the points in space with respect to the robot coordinate system.

4. The method of claim 3, wherein the at least one virtual image is a virtual image for operation implementation, and wherein determining the position coordinates with respect to the 3D measurement coordinates system comprises:
    establishing the position coordinates with respect to the robot coordinate system for at least one of the points in space;
    positioning a reference point of a movable robot element of the robot at the at least one point in space; and
    generating a virtual image for calibration using the optical 3D measurement system, wherein the virtual image for calibration captures at least one part of the component and captures the reference point at the at least one point in space in coordinates with respect to the 3D measurement coordinate system.

5. The method of claim 4, further comprising:
calibrating the reference point located on the movable robot element to the robot coordinate system.

6. The method of claim 1, wherein the at least one virtual image captures the tool element in a given tool element positioning and together with a plurality of orientation points arranged on the tool element.

7. The method of claim 6, further comprising:
repositioning the component and/or placing a different component in a detection region of the optical 3D measurement system; and
generating a further virtual image with respect to the 3D measurement coordinate system.

8. The method of claim 7, wherein the further virtual image captures a surface region of the repositioned or other component and captures the plurality of orientation points on the tool element located in the given tool element positioning with respect to the 3D measurement coordinate system.

9. The method of claim 7, further comprising:
converting a plurality of point coordinates of the further virtual image into point coordinates with respect to the robot coordinate system by the transformation instruction; and
controlling the robot using the point coordinates with respect to the robot coordinate system so as to implement a further operation.

10. The method of claim 1, wherein the at least one virtual image captures the component in a given component positioning and captures the tool element having a plurality of orientation points arranged thereon.

11. The method of claim 10, further comprising:
repositioning the robot; and
generating a further virtual image with respect to the 3D measurement coordinate system.

12. The method of claim 11, wherein the further virtual image captures the surface region and/or a further surface region of the component located in the given component positioning and the plurality of orientation points arranged on the tool element of the repositioned robot.

13. The method according to claim 10, further comprising:
converting a plurality of point coordinates of the further virtual image into point coordinates with respect to the robot coordinate system by the transformation instruction; and
controlling the repositioned robot using the point coordinates with respect to the robot coordinate system so as to implement a further operation.

14. A non-transitory computer-readable storage media comprising instructions which, when executed by a computer which is integrated into an installation comprising a robot and an optical 3D measurement system connected for communication therewith or is connected to such an installation, cause or make it possible for a method to be carried out, the method comprising:
generating at least one virtual image by an optical 3D measurement system and with respect to a coordinate system of the optical 3D measurement system, referred to as 3D measurement coordinate system, wherein the at least one virtual image captures a surface region of a component;
converting a plurality of point coordinates of the at least one virtual image into point coordinates with respect to a robot coordinate system by a transformation instruction;
determining implementation parameters for the operation using details gathered by the at least one virtual image and the plurality of point coordinates with respect to the 3D measurement coordinate system and with respect to the robot coordinate system; and
controlling a tool element of the robot using the point coordinates with respect to the robot coordinate system so as to implement the operation;
wherein the plurality of point coordinates of the at least one virtual image define at least one portion of a trajectory along which the operation is provided by the tool element; and
wherein an implementation of the operation is monitored or regulated by generating at least one additional virtual image using the optical 3D measurement system and substantially simultaneously transmitting the at least one additional virtual image to the robot, whereby the robot subsequently controls or regulates its operations by taking into account a result captured by the at least one additional virtual image.

15. An installation for automatically implementing operations, comprising:
an optical 3D measurement system; and
a robot comprising at least one tool element which is controllable by a robot control system, the robot control system being based on a robot coordinate system,
the installation being configured to:
generate at least one virtual image by the optical 3D measurement system and with respect to a coordinate system of the optical 3D measurement system, referred to in the following as the 3D measurement coordinate system, wherein the at least one virtual image captures a surface region of a component;
convert a plurality of point coordinates of the at least one virtual image into point coordinates with respect to the robot coordinate system by a transformation instruction;
determine implementation parameters for the operations using details gathered by the at least one virtual image and the plurality of point coordinates with respect to the 3D measurement coordinate system and with respect to the robot coordinate system; and
control the tool element of the robot using the point coordinates with respect to the robot coordinate system so as to implement the operation;
wherein the plurality of point coordinates of the at least one virtual image define at least one portion of a trajectory along which the operation is provided by the tool element; and
wherein an implementation of the operations is monitored or regulated by generating at least one additional virtual image using the optical 3D measurement system and substantially simultaneously transmitting the at least one additional virtual image to the robot, whereby the robot subsequently controls or regulates its operations by taking into account a result captured by the at least one additional virtual image.

* * * * *